(12) United States Patent
Cipriani et al.

(10) Patent No.: US 8,203,701 B2
(45) Date of Patent: Jun. 19, 2012

(54) APPARATUS AND METHOD FOR CHECKING COMPONENT PARTS OF A MECHANICAL PIECE

(75) Inventors: Riccardo Cipriani, Ferrara (IT); Stefano Romagnoli, Bologna (IT)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 159 days.

(21) Appl. No.: 12/677,710

(22) PCT Filed: Sep. 18, 2008

(86) PCT No.: PCT/EP2008/062459
§ 371 (c)(1), (2), (4) Date: Mar. 11, 2010

(87) PCT Pub. No.: WO2009/037318
PCT Pub. Date: Mar. 26, 2009

(65) Prior Publication Data
US 2010/0201971 A1    Aug. 12, 2010

(30) Foreign Application Priority Data

Sep. 19, 2007 (IT) .............................. BO2007A0637

(51) Int. Cl.
*G01B 11/26* (2006.01)
(52) U.S. Cl. ................................................. 356/139.03
(58) Field of Classification Search ........ 356/3.01–3.15, 356/4.01–4.1, 5.01–5.15, 6–22, 28, 28.5, 356/139.01, 139.1
See application file for complete search history.

(56) References Cited

U.S. PATENT DOCUMENTS

| 6,347,460 | B1 * | 2/2002 | Forrer et al. ................... 33/626 |
| 7,079,455 | B2 | 7/2006 | Cheong et al. |
| 2001/0035960 | A1 * | 11/2001 | Johnston ....................... 356/507 |
| 2005/0068661 | A1 | 3/2005 | Byun et al. |
| 2008/0151430 | A1 | 6/2008 | Zhu et al. |

FOREIGN PATENT DOCUMENTS

| CH | 696 774 A5 | 11/2007 |
| CN | 1179332 C | 12/2004 |
| WO | WO 99/24785 A1 | 5/1999 |
| WO | WO 2006/097445 A1 | 9/2006 |

* cited by examiner

*Primary Examiner* — Thomas Tarcza
*Assistant Examiner* — Luke Ratcliffe
(74) *Attorney, Agent, or Firm* — Dickstein Shapiro LLP

(57) ABSTRACT

An optoelectronic system for checking the relative attitude of component parts of an HSA (32) including a base (2); a reference system (40) connected to the base and having a stationary support (3) adapted to cooperate with positioning surfaces (34) of the HSA, and a floating device (10) which floats with respect to the stationary support and is adapted to cooperate with working surfaces (33) of the HSA; an optoelectronic detection device; and a processing unit for receiving and processing signals of the optoelectronic detection device. The floating device includes a floating element (11) adapted to cooperate with the optoelectronic detection device. A method for checking the relative attitude of component parts of a mechanical piece by means of an optoelectronic system includes the steps of referring a first component part of the HSA to the reference system; locking the HSA at a checking position; bringing the floating device with the floating element (11) to contact a second component part of the HSA; and carrying out dimensional and positional checkings of component parts of the floating element (11) by means of the optoelectronic system.

10 Claims, 2 Drawing Sheets

APPARATUS AND METHOD FOR CHECKING COMPONENT PARTS OF A MECHANICAL PIECE

TECHNICAL FIELD

The present invention relates to an optoelectronic system for checking relative attitude of component parts of a mechanical piece including a base; a reference system, connected to the base and adapted to refer the mechanical piece in a predetermined position, the reference system including a stationary support which defines a reference plane and is adapted to cooperate with positioning surfaces of the mechanical piece; an optoelectronic detection system; and a processing unit adapted for receiving and processing signals of the optoelectronic detection device. The present invention also relates to a method for checking relative attitude of component parts of a mechanical piece by means of an optoelectronic system, including the steps of referring a first component part of the mechanical piece in a reference system; and locking the mechanical piece to be checked at a checking position.

BACKGROUND ART

There are known hard disk storage units, or "hard disks", for storing and recalling data, that are employed in electronic systems such as computers. Hard disks typically include one or more magnetic read/write heads that are connected to sliders and are placed near a surface of a rotating magnetic disk. When the magnetic disk is driven into rotation, a thin air cushion forms between the disk and the slider, enabling the latter to "float" over the disk at a distance which is in the range of a few tens of nanometers, or even less, in the current hard disks. In the course of the disk rotation, the magnetic read/write elements can be utilized to read/write bits of data along a magnetic track on the magnetic disk.

It is known that the heads employed in the known hard disks are very complex and delicate and thus are checked before the assembly in the hard disks.

Generally, the heads are checked once they have been assembled in "Head Gimbal Assembly" (HGA) or one or more HGA have been assembled in a "Head Stack Assembly" (HSA). Typically, the HGA includes a head with an associated slider, and a resilient thin plate to which the head is connected by means of a joint. Each of the thin plates has one end, opposite with respect to the end carrying the head, which is connected to a E-shaped support or "E-block" having a plurality of mutually parallel wings. The assembly of the E-block and the HGAs is called HSA and is utilized for reading or writing on one face or both the faces of one or more magnetic disks. The HSA also includes a bearing which couples the HSA to stationary component parts of the hard disk and enables the former to rotate under the control of a motor of the VCM ("Voice Coil Motor") type, for moving the magnetic heads on the magnetic disks.

Checking operations carried out on the HSA, before the latter is assembled in the hard disk, typically include dimensional and attitude checking of the heads, of the associated sliders as well as of the E-block wings. Such checking operations are carried out by dedicated systems that typically comprise a rest structure, reference and locking devices of the HSA to be checked for referring and locking the HSA in the rest structure, checking devices for checking the conformity of the dimensions and the attitude ("roll" angle and "pitch" angle) of the HSA with the project specifications, and displacement devices of the HSA for rotating and/or translating the HSA with respect to the checking devices.

European patent No. EP 1029219 B1 discloses an optoelectronic apparatus for checking position and/or form deviation of mechanical pieces, for example HSA sliders, which includes, among other things, a base, a locking and reference system for the E-block of the HSA to be checked, detection devices with an optoelectronic system for providing signals indicative of the position of the piece component parts, a processing unit for processing signals provided by the detection devices, and a rotation system enabling mutual rotations between the piece and the optoelectronic system. In the course of mutual rotations between the HSA and the optoelectronic system, signals indicative of the spatial position of the sliders are detected by means of the optoelectronic system. Once processed, said signals provide information concerning the dimension and/or the attitude of the sliders with respect to a reference plane, which is defined by the base.

The international patent application published with No. WO 2006/097445 discloses an optoelectronic apparatus which can check dimensions and attitude of mechanical pieces, in particular HSA sliders, having smaller dimensions than those checked with the apparatus illustrated in the patent No. EP 1029219 B1.

The optoelectronic apparatus disclosed in patent publication No. WO 2006/097445 includes a base, a locking and reference system for the E-block of the HSA to be checked, a translation system, and a rotation system enabling mutual translations and rotations between the piece and the optoelectronic system, in the course of which an optoelectronic device provides signals indicative of the position of the sliders of the HSA to be checked. Such an apparatus provides remarkable standards of metrological performance and can provide measures related to height and attitude of the sliders that are referred to a locating plane defined by the base.

In the apparatuses disclosed in the previously mentioned patent documents, the sliders attitude is detected in a checking condition and is influenced by the HSA E-block, since the arrangement of the parts to be checked is established by the connection of the E-block to the locking and reference system.

The attitude of the HSA sliders in a working condition, which means once the HSA has been assembled in the associated hard disk, generally differs from the attitude that has been previously checked, owing to the influence applied not only by the E-block attitude but also by the bearing attitude, which couples to a suitable seat of the hard disk and thus determines the whole attitude of the HSA in the working condition. That is, whether attitude of the sliders is checked with reference to the E-block, the working conditions of the HSA are not taken into consideration, and this can introduce errors. In other words, sliders having an attitude according to the project specifications in a checking condition, could have an attitude differing from the project specifications in a working condition, and vice-versa.

DISCLOSURE OF THE INVENTION

Object of the present invention is to provide a checking apparatus and relevant method for HSAs of hard disks which overcome the disadvantages of the known apparatuses and methods.

This and other objects are achieved by an optoelectronic system and a checking method of the static type according to claim 1 and claim 6, respectively.

The optoelectronic checking system according to the present invention enables to check attitude characteristics of HSA component parts, such as for example the bearing, that are essential for evaluating the arrangement of the sliders and thus of the read/write heads with extremely high accuracy.

BRIEF DESCRIPTION OF THE DRAWINGS

The invention is now described with reference to the enclosed sheets of drawings, given by way of non limiting examples, wherein.

BEST MODE FOR CARRYING OUT THE INVENTION

Figure 1:
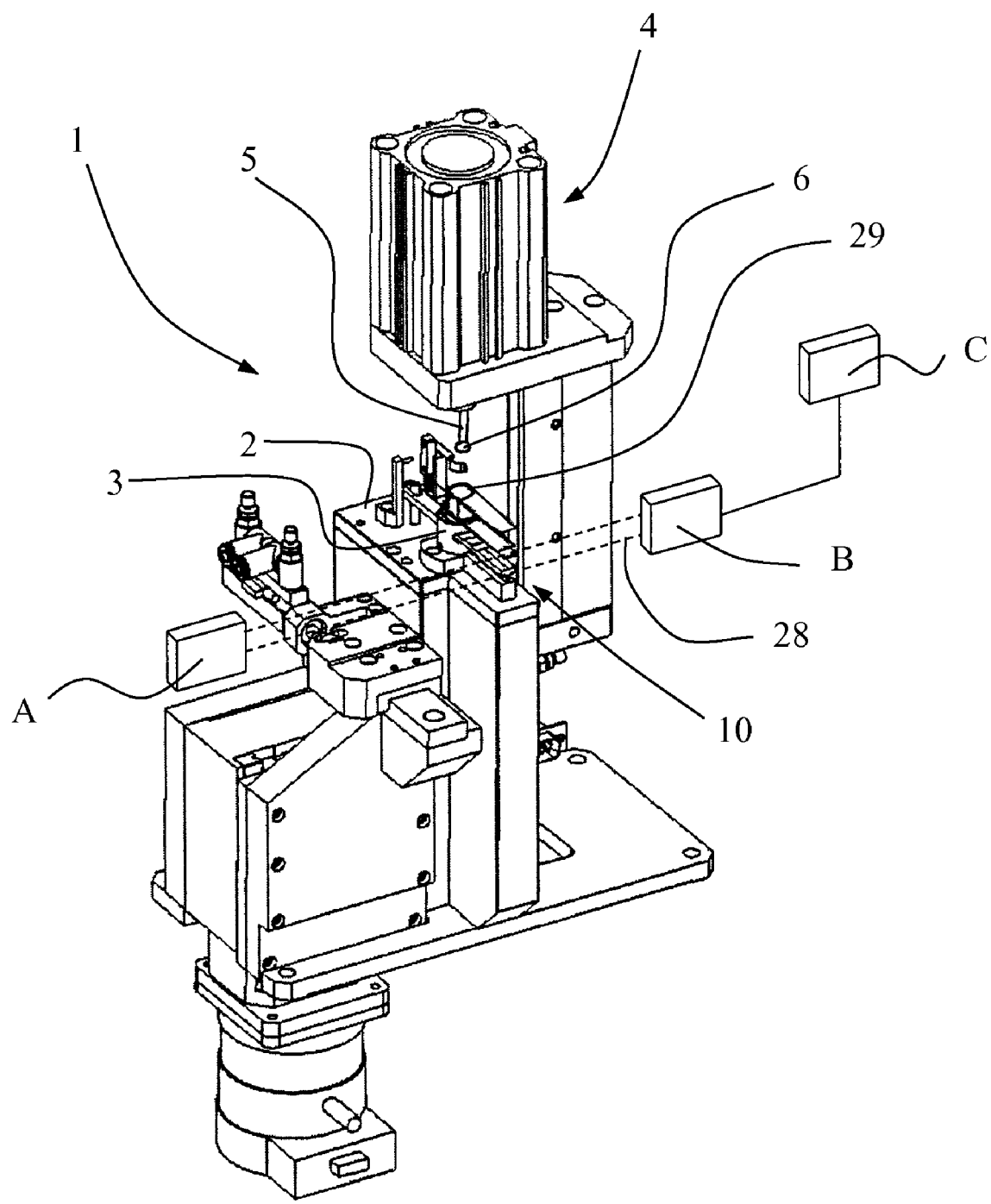
FIG. 1 is a perspective view of a checking system according to the present invention, with some elements omitted for the sake of simplicity.

An optoelectronic checking system 1 according to the present invention, for an HSA that is shown in simplified way in FIG. 1, includes a base 2 carrying a reference system 40 for an E-block 29 of the HSA to be checked, a locking system 4 and a detection system. The locking system 4 may be of a known type having a rod 5 which carries a floating ball 6 for locking the E-block 29 to a stationary support, in particular a reference nosepiece 3. The detection device may be for example of the optoelectronic shadow casting type, which is per se known and thus illustrated in a very simplified way with the blocks A,B representing an emitter and a receiver, respectively. A processing unit C is connected to the optoelectronic system, in particular to the receiver B, for processing the signals provided by the latter.

Figure 2:
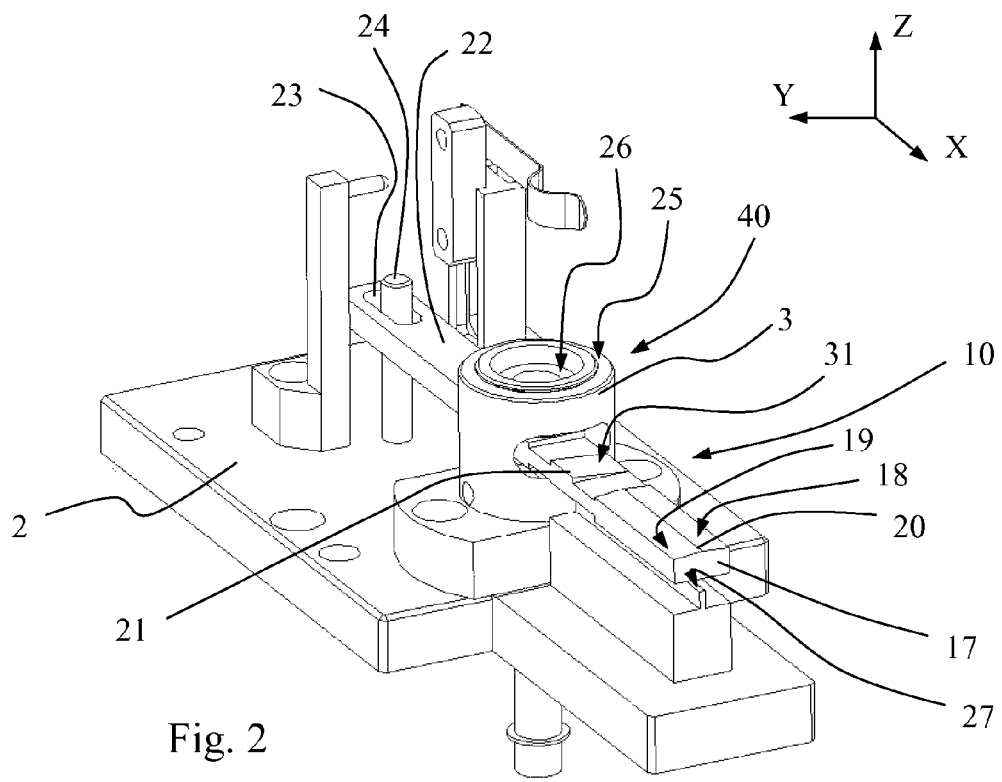
FIG. 2 is a perspective view of a component part of the checking system shown in FIG. 1.
Figure 3:
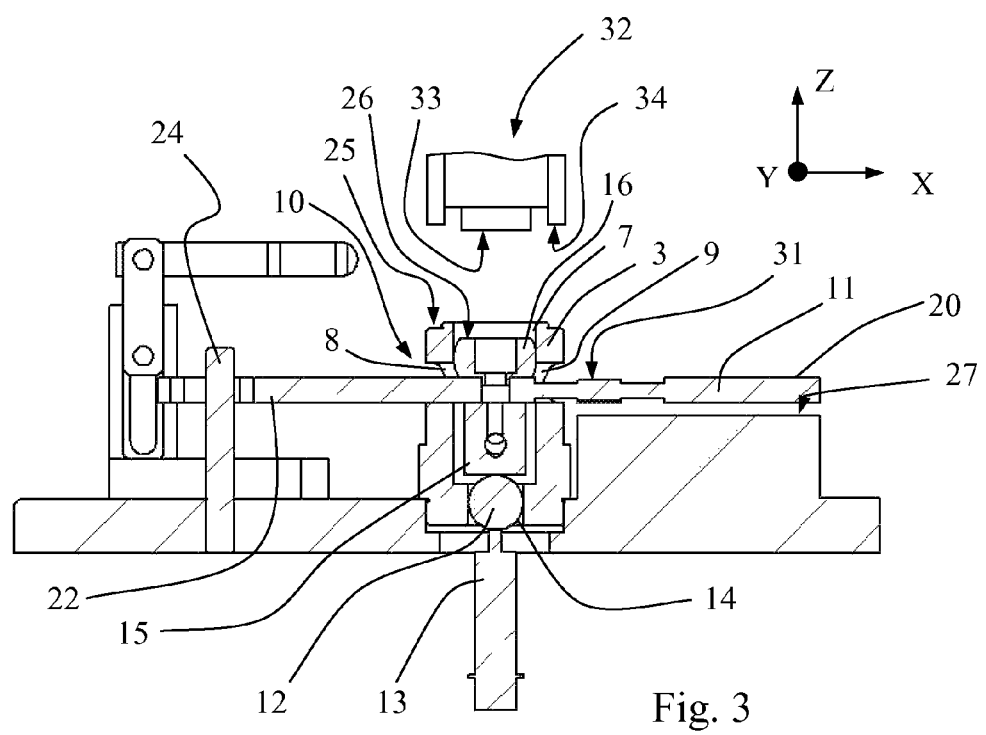
FIG. 3 is a longitudinal cross-section along the plane XZ of the component part of FIG. 2.

The reference system 40 includes the reference nosepiece 3, a floating device 10, a ball 12, a thrust element 13, and a reference plane surface 27 (FIGS. 2 and 3). The reference nosepiece 3, defining a reference system XYZ, is connected to the base 2 and is substantially cylindrically shaped with a longitudinal through hole 7 defining the direction Z, two side openings 8,9 and a reference annular surface 25 for the E-block of the HSA to be checked. The reference nosepiece 3 also includes a lower opening 14 wherein the ball 12 is housed and can slide along the direction Z. More specifically, the ball 12 is arranged between—and in contact with—the thrust element 13, for example a pneumatic cylinder, and the floating device 10, which is partly housed in the through hole 7 and can float within the nosepiece 3. The floating device 10 includes a floating element 11 defining an adjustable plane and is locked by a not illustrated screw between a rest element 15 and a floating nosepiece 16 having a rest surface 26. The floating element 11 is suitably shaped, as it will be hereinafter disclosed in detail, and mostly extends along a direction transversal to the direction Z.

The floating element 11 protrudes from the side openings 8, 9 of nosepiece 3 and includes a first shaped end portion 17 featuring two longitudinal plane surfaces 18, 19 being mutually convergent and defining an edge 20 at a substantially middle longitudinal section of the floating element 11. The end portion 17 also includes a checking portion 21 with a decreasing thickness which defines a suitable sloping plane surface 31, for example with a slope of less than 10°, with respect to the adjustable plane defined by the whole floating element 11. An end portion 22 of the floating element 11, which is longitudinally opposed to the first end portion, includes a slot 23 for a guide pin 24 connected to the base 2.

The optoelectronic checking system 1 enables to check the roll and pitch angles of the bearing of a HSA in a static way, said angles being defined as rotated arrangements of the bearing about directions X and Y perpendicular to the direction Z.

The operation of the optoelectronic checking system 1 is herein disclosed in more detail.

In a preliminary calibration phase, an HSA sample 32, which is partly visible in FIG. 3, is checked for determining a sample attitude to which the subsequent attitude checkings carried out on the bearing of the HSA will make reference. An HSA sample does not typically includes the bearing but it is shaped so as to include an external surface 33 reproducing the theoretical arrangement of a working surface of the bearing, said working surface defining in turn the working attitude of the HSA. Hence, the HSA sample 32 is located and referred at positioning surfaces 34 of a first component part, in particular of the associated E-block, on the reference surface 25 of the reference nosepiece 3, and locked by the floating ball 6 of the locking device 4 at a predetermined checking position, in such a way that the thin plates of the HSA are arranged substantially parallel to the floating element 11, aligned with the end portion 17. Once locked the HSA sample 32 in the predetermined checking position, the pneumatic piston is actuated for urging the ball 12 against the rest element 15 of the floating device 10, which is in turn urged to contact a second component part of the HSA sample 32, in particular the above-mentioned external surface 33. Thus, the rest surface 26 of the floating nosepiece 16 fully rests on the external surface 33 of the HSA sample 32 and reproduces the attitude of the latter. As the floating element 11 is integral with the floating nosepiece 16, the former takes the same attitude of the HSA sample 32, too. It should be noted that, although the E-block is referred to the reference nosepiece 3, the floating element 11 contacts the external surface 33 of the HSA sample 32 which reproduces the bearing and takes the attitude of the latter regardless of the E-block attitude.

The utilized optoelectronic detection device is, as hereinbefore said, of the known shadow casting type and includes an emitter A emitting infrared beams (shown in simplified form by broken lines in FIG. 1 and identified by reference number 28) that travel towards a receiver B including a plurality of photodetectors. A mechanical piece located between the emitter A and the receiver B partly intercepts the emitted beams 28 and, as a consequence, just a part of the emitted beams 28 is detected by the receiver B. The part of emitted beams 28 that are detected by the receiver B provides information about the dimensions of the mechanical piece in a per se known way.

The optoelectronic device is arranged in such a way that the emitted beams 28 lay substantially on a plane YZ perpendicular to the direction X and the floating element 11 is arranged between the emitter A and the receiver B. The floating element 11 thus intercepts the beams 28 emitted by the emitter A and determines a shadow area upon the receiver B. In particular, at a determined transversal section, the optoelectronic device detects a thickness dimension or "virtual" thickness of the floating element 11, which corresponds to the length along the direction Z of the projection of the considered section of the floating element 11.

At a transversal section of the checking portion 21, the "virtual" thickness detected by the optoelectronic device depends on the slope of the plane surface 31 with respect to the plane XY. Such a slope depends on both the geometric characteristics and the attitude of the floating element 11, which is determined by the roll angle of the external surface 33 of the HSA 32, as hereinbefore explained. During the calibration phase carried out with the HSA sample 32, there is assumed that the thickness dimension of the floating element 11, detected at a determined transversal section of the checking portion 21, corresponds to a zero value of a roll angle.

By virtue of the slope of the plane surface 31 with respect to the adjustable plane defined by the floating element 11, it is possible, for limited values of the roll angle, to detect whether variations of the roll angle are positive or negative. If otherwise the plane surface 31 were parallel to the adjustable plane, rotations occurring in both directions would cause an increasing of the detected thickness dimension. On the contrary, when the plane surface 31 is suitably sloping, the amount of the virtual thickness depends on the rotation direction of the floating element 11. By way of example, it should be noted that, with reference to the view of FIG. 2, when the floating element 11 rotates about the direction X in a clockwise direction, the virtual thickness increases; whereas in the case of rotations of the floating element 11 in a counterclockwise direction, the virtual thickness decreases.

It is also possible to check the height and the pitch angle of the floating element 11, and thus of the external surface 33 of the HSA sample 32, by checking—by means of the optoelectronic detection device—the height and inclination on plane XZ of the edge 20. It is to be noted that, for limited variations of the roll angle, the edge 20 defines the upper end of the virtual thickness of the floating element 11 at the considered transversal section and is not eclipsed by other points of the end portion 17. An height reference value can be associated to the height of the edge 20 at a determined transversal section with reference, for instance, to the reference plane surface 27. The pitch angle can be checked by repeating the height checking of the floating element 11 at least one different transversal section including the edge 20, and processing the achieved results in a known way. In this case too, it is possible to associate a value equal to zero to the height and pitch value which is detected when the HSA sample 32 is assembled.

Once finished the preliminary calibration phase, it is possible to proceed with the real check and replace the HSA sample 32 with an HSA to be checked.

Similarly to what has been previously disclosed, the HSA is referred to the annular reference surface 25 by means of suitable positioning surfaces of the E-block 29, and is locked in a predetermined checking position by the locking device 4. Once the checking position of the HSA is defined, the pneumatic piston 13 is actuated for urging the floating device 10 to contact suitable working surfaces of the HSA bearing. Hence, the floating element 11 and relevant adjustable plane take the attitude of the working surfaces of the HSA bearing, in terms of height and roll and pitch angles, that generally differ from the previous case relating to the HSA sample 32.

In practice, the height and the roll and pitch angles of the HSA bearing are obtained, by means of processing carried out in the unit C of the signals provided by the receiver B, by comparing them with the values of the height and the roll and pitch angles detected in the calibration phase with the HSA sample 32.

The optoelectronic checking system can be modified, without departing from the scope of protection of the present invention. Component parts that are differently shaped or have different dimensions from those hereinbefore described, can be employed as well. In particular, the floating element 11 can be differently shaped, and, for example, the edge 20 and the abutment plane 21 thereof can be reversely arranged or have different slopes.

The invention claimed is:

1. An optoelectronic system for checking relative attitude of component parts of a mechanical piece, the mechanical piece including positioning surfaces and one component part of said component parts including a working surface, said optoelectronic system comprising:
    a base;
    a reference system, connected to the base and adapted to refer the mechanical piece in a predetermined position, the reference system including a stationary support which defines a reference plane and is adapted to cooperate with said positioning surfaces in order to locate the mechanical piece;
    an optoelectronic detection device; and
    a processing unit adapted for receiving and processing signals of the optoelectronic detection device,
    wherein said reference system further includes a floating device which floats with respect to the stationary support and is adapted to be urged to contact said working surface so as to take the attitude of said one component part, said floating device including a floating element which defines an adjustable plane adapted to cooperate with the optoelectronic detection device.

2. The optoelectronic system according to claim 1, wherein the optoelectronic detection device is adapted to provide signals indicative of the position and/or the dimensions of portions of said floating element, and said processing unit is adapted to provide information concerning the relative attitude of said one component part of the mechanical piece to be checked.

3. The optoelectronic system according to claim 1, wherein said floating element includes a checking portion having a plane surface which is sloping with respect to said adjustable plane.

4. The optoelectronic system according to claim 1, wherein said floating element includes two longitudinal plane surfaces that are convergent so as to form an edge at a substantially middle longitudinal section of the floating element.

5. The optoelectronic system according to claim 1, wherein the floating device includes a floating nosepiece integral with the floating element which defines a rest surface and is adapted to be urged to contact said working surface of said one component part of the mechanical piece.

6. A method for checking relative attitude of component parts of a mechanical piece by means of an optoelectronic system, including the steps of:
    locating a first component part of the mechanical piece in a predetermined position defined by a reference system;
    locking the mechanical piece to be checked at a checking position;
    bringing a floating device including a floating element to contact a second component part of the mechanical piece, thereby taking the attitude of a working surface of said second component; and
    carrying out dimensional and positional checkings of portions of the floating element by means of the optoelectronic system.

7. The method according to claim 6, wherein said mechanical piece to be checked is a head stack assembly (HSA) including an E-block and a bearing, said first component part corresponding to the E-block and said second component part corresponding to the bearing.

8. The method according to claim 6, wherein said step of carrying out dimensional and positional checkings of portions of the floating element includes the step of checking thickness dimensions of the floating element at a transversal section.

9. A method for checking relative attitude of component parts of a mechanical piece by means of an optoelectronic system, including the steps of referring a first component part of the mechanical piece to a reference system;

locking the mechanical piece to be checked at a checking position;

bringing a floating device including a floating element to contact a second component part of the mechanical piece; and carrying out dimensional and positional checkings of portions of the floating element by means of the optoelectronic system, wherein said mechanical piece to be checked is a head stack assembly (HAS) including an E-block and a bearing, said first component part corresponding to the E-block and said second component part corresponding to the bearing.

10. The method according to claim 9, wherein said step of carrying out dimensional and positional checkings of portions of the floating element includes the step of checking thickness dimensions of the floating element at a transversal section.

* * * * *